Patented Apr. 15, 1941

2,238,446

UNITED STATES PATENT OFFICE 2,238,446

OPACIFICATION OF RESINS

Glen M. Kuettel, Bloomfield, N. J., assignor to E. I. du Pont de Nemours & Company, Wilmington, Del., a corporation of Delaware No Drawing. Application September 6, 1939, Serial No. 293,567

5 Claims. (Cl. 18—55)

This invention relates to the opacification of resins and, more particularly, to the production of white opacification in ethenoid resins such as polymethyl methacrylate, both in cast and in molded form.

White opacification of resins such as polymethyl methacrylate has heretofore been accomplished by the incorporation of suitable pigments, such as zinc oxide and titanium dioxide, either with the resin-forming material prior to its polymerization or with the fully polymerized resin. In either case, special care and precautions have been found necessary to ensure uniformity of opacification of articles molded from such resin in comminuted form. The opacification of such resinous material in cast form has, moreover, presented a special problem in view of the difficulty of avoiding aggregation and precipitation of the pigmenting ingredient. Nor has the prior art offered a feasible method whereby such resins in massive cast form could be opacified through only part of their thickness.

It is an object of the present invention to provide a novel and improved method of opacifying plastics comprising ethenoid resins such as polymethyl methacrylate. More particularly, it is an object of the invention to effect such opacification in simple and economical manner without the introduction of conventional pigments into the material either before or after its polymerization. More specific objects of the invention are to effect, in articles molded from such plastics, a permanent white opacification which may, if desired, be of uniform appearance, and to effect, in such plastics in massive form, a permanent white opacification of the surface layers. A further object is a process of effecting coloration of such plastics in conjunction with such opacification. Other objects will appear from the description of the invention given hereinafter.

In accordance with the present invention, the above objects are accomplished by heating a plastic comprising an ethenoid resin from the group consisting of polystyrene and polymethyl methacrylate, in contact with water at a temperature of at least about 100° C., i. e., with water at or near its boiling point under atmospheric pressure or under higher pressure, or with steam, for a sufficient time to effect the desired opacification.

It has been discovered that a molded article characterized by white opacification may be made by incorporating with the plastic in finely divided condition a quantity of water, preferably of the order of from 1 to 5 per cent of its weight, and then subjecting the plastic, thus moistened, to heat and pressure in a mold. The opacification thereby produced is of uniform character, as viewed by the unaided eye, provided that the comminuted plastic has been not coarser than about 40 mesh and has been uniformly moistened.

Coloration may be effected by the use of an aqueous solution of a dyestuff, in place of water alone.

Also, in accordance with the invention, white opacification is produced in the superficial layers of such a plastic in massive form, e. g., a cast resin or a molded article, by subjecting it to direct contact with water at not less than approximately its boiling temperature. The opacification is facilitated by the presence in the plastic, associated with the resin, of plasticizer or ethenoid monomer; the use of temperatures substantially above 100° C., and of pressures above atmospheric, becomes necessary or desirable as the content of such auxiliary substance is reduced.

The term "opacification" is used herein to include any marked obstruction to the passage of light, comparable in its effect upon the appearance of the plastic to that of incorporating in the plastic mineral pigments, such as titanium dioxide, or pulverized bleached cellulose. The use of the term is not limited herein to the production of complete opacity, i. e., the complete obstruction of the passage of light; it is to be understood as meaning equally well the partial obstruction of light which results in an appearance of translucency. Actually, the difference between complete opacity and translucency (incomplete opacity) is one of degree only. Furthermore, a material which is completely opaque in a thick section may be translucent in a thin section.

The invention is particularly applicable to plastics comprising polymethyl methacrylate, which, alone or in admixture with suitable modifying ingredients, may be molded, by ordinary thermoplastic technique, either by compression or by injection, to produce molded articles of desirable characteristics well known to the trade, and which is commercially available also in cast form. It is, however, applicable to plastics comprising polystyrene resins.

Such plastics may comprise nothing but a resin resulting from complete polymerization of the corresponding monomer or may contain accidental residues of unpolymerized monomer, or minor proportions of plasticizer or other auxiliary ingredient, or both.

The ethenoid resin polymers herein considered are characterized in general by a high degree of resistance to water and it is accordingly surprising that, upon being submitted to the process of the present invention, they should develop a cloudiness or opacity, probably the result of absorption of water, as though by a precipitation in manner analogous to that familiar in the cases of water-sensitive plastics such as cellulose acetate. Furthermore, it is surprising that the opacification thus produced is permanent under ordinary conditions of exposure and even under prolonged storage at elevated temperature. This opacification does not disappear upon aging nor upon being subjected to conditions promoting the removal of moisture, as does the cloudiness induced by penetration of moisture into a plastic of the water-sensitive type such as cellulose acetate.

Because an article molded from coarse particles of polymer moistened with water is usually spotty and irregular in its opacification and the opacification produced by the invention in a mass of cast resin is usually limited to the superficial layers thereof, it appears that the depth of penetration of the water, which penetration is believed to be the cause of the opacification, is shallow under ordinary conditions of conduct of the invention. As a result of the shallowness of this assumed penetration, it has been found that a uniformly white opacification in a molded article is obtained by the method of the invention usually only when the particles of resin, from which the molded article has been formed, have not been coarser than about 40 mesh and have been moistened with water in a uniform manner.

It will be evident that the processes applied respectively to molding compounds and to massive resins are broadly the same, comprising the holding of the resin in contact with water at a temperature of at least about 100° C. The temperature applied in the molding of such resins is, as is well known, always well above this point, usually not less than about 130° C. and frequently 150° C. or higher.

Assuming an adequate supply of water in contact with the surface of the resin, the rate of development of the opacification is a function of the duration and temperature and pressure of the opacifying treatment. It is believed that the rapidity of the development of opacity in the molding of moist granular resin—which development is complete within the few minutes of the ordinary molding cycle—and the comparative slowness of its development in massive resin immersed in water at 100° C., or slightly higher, is explainable as the result of the influence of temperature and pressure.

In the opacification of massive shapes, the result is most readily controlled by the duration of the treatment. In the molding of moist granular resin, however, the development of opacity is too rapid for control by duration of heating, and, furthermore, the duration of heating in the mold will normally be governed by the molding characteristics of the resin and the design of the mold; here the control of opacity is achieved by the proper proportioning of the water mixed with the molding compound.

The following examples illustrate preferred specific embodiments of the invention. Examples I to VI, inclusive, illustrate the invention as applied to the preparation of molding powder and the molding therefrom of articles characterized by white opacification. It is optional whether the water be added to a previously dried granular or pulverulent polymer, or whether such polymer, produced in an aqueous vehicle, be dried incompletely so as to leave the requisite percentage of water. In either case, it is evident that uniformity of distribution of the water will be facilitated by suitably stirring the batch. All parts are given by weight unless otherwise stated:

*Example I.*—Methyl methacrylate is polymerized under conditions which yield the polymeric methyl methacrylate in the form of granules for the most part finer than 40 mesh. This granular polymer, after having been dried, is screened through a 40 mesh sieve. The material passing the 40 mesh sieve is thoroughly stirred with 2.0 per cent of its own weight of water.

Upon being molded into articles by ordinary technique, this molding powder gives a product of a uniform pure white color, and the molded articles are substantially opaque in thicknesses from about $\frac{1}{16}$ inch upwards.

*Example II.*—A similarly prepared mixture of:

| | Parts |
|---|---|
| Polymethyl methacrylate (passing 40 mesh screen) | 100 |
| Water | 1.5 | gives a molded article of a handsome uniform translucent white.

*Example III.*—Polymethyl methacrylate prepared by polymerizing an emulsion of methyl methacrylate in an aqueous vehicle is rinsed and dried by methods known to the art. Upon being mixed with water in the proportions used in Example I, this polymer gives molded articles similar in appearance to those of Example I.

*Example IV.*—Granules or fragments of polymethyl methacrylate, of which at least the greater part are coarser than about 20 mesh and of which some are as coarse as 10 mesh, are moistened with about 1 per cent of water and stirred to distribute the water. An article molded from this mixture exhibits a mottle of colorless transparent with opaque and translucent white.

*Example V.*—Comminuted polystyrene is mixed with 2.0 per cent of its weight of water and molded while moist. The resulting article is translucent in thickness 0.2 inch.

A more marked opacification is obtained by using a larger percentage of water.

The white opacification may be combined with coloration of the polymer by the simple procedure of dissolving a suitable proportion of a water-soluble dyestuff in the water used, as indicated in Example VI.

*Example VI.*—Polymethyl methacrylate passing a 60 mesh screen, 100 parts, is thoroughly stirred with water, 2 parts, containing in solution 0.01 part of National Cloth Red B, a water-soluble dyestuff (Color Index No. 262). Articles molded from the resulting mixture are of opaque pink color.

Since obviously the molding powder prepared in accordance with this invention is merely superficially dampened with the requisite amount of water, it will be evident that reasonable precautions must be taken to avoid failure through evaporation of this water prior to the use of the granular material. Shipment and storage in airtight containers is indicated. In the course of actual use in the molding shop, the precaution normally followed with molding powders of delicate color, namely, of keeping the container covered in order to prevent entrance of dirt, will serve very well to prevent evaporation of water. The addition of a little glycerine to the water used in making the molding powder will retard its evaporation.

Examples VII to XII illustrate the opacification of the surface layers of resin in massive form.

*Example VII.*—A rod of polymethyl methacrylate formed by the process of C. M. Fields United States Patent No. 2,057,674 is placed in a container adapted to be sealed against internal pressure, and provided with intake and discharge pipes and jacketed for heating and cooling. The container and contents are then heated by the passage of boiling water through the container and the introduction of steam, under a pressure of 60–70 pounds per square inch, into the jacket. When the rod has been brought to a temperature of about 100° C., the discharge valve of the container is closed and the supply of boiling water cut off, and the intake valve is then connected with a source of hydraulic pressure of 2500 pounds per square inch. The intake valve is left open and the steam circulation in the jacket is continued for 90 minutes. The steam circulation in the jacket is then discontinued and cold water circulated through the jacket for about 30 minutes; thereafter, the hydraulic pressure is cut off, the container opened, and the rod removed. If the rod has lost its straightness by this treatment, it is immersed in boiling water and then rolled on a flat surface before it regains its rigidity.

The rod thus obtained is of a translucent white. When the rod is cut, it is found that the opacification is localized at and close to the surfaces which have been in contact with the hot water in the cylinder while the main body of the rod retains its original colorless transparency. By suitable carving, beveling, and the like, the opacified layer may be cut away, revealing the transparent body material beneath. In this manner the rod may be fabricated into umbrella handles, cutlery handles, et cetera, of ornamental character.

*Example VIII.*—A rod of polymethyl methacrylate having a hexagonal cross-section is formed by the process of C. M. Fields United States Patent No. 2,057,674 in a mold of hexagonal cross-section. This rod is treated as in Example VII. Its six dihedral angles are then beveled off so that it is converted into a rod of duodecagonal cross-section of alternate white and transparent faces.

*Example IX.*—By the method of C. M. Fields United States Patent No. 2,057,674 there is formed a rod of polymethyl methacrylate of pink color, this coloration being provided by the addition of Oil Red (Color Index No. 248), 0.01 part, to the monomer, 100 parts. This rod is superficially opacified by the method of Example VII. It thus becomes of a translucent pink as a result of the illumination of the white translucent surface by the colored light transmitted through the unopacified central portion. Decorative effects may be obtained by carving.

*Example X.*—A block of polymethyl methacrylate containing 10 per cent of dibutyl phthalate as plasticizer is immersed in water boiling at atmospheric pressure. White opacification of the surface begins within a few hours and is intensified by prolonging the treatment.

*Example XI.*—A block of polystyrene is immersed in water boiling at atmospheric pressure for 1.5 hours. This treatment renders the block translucent in appearance.

It will be understood that the above examples are merely illustrative of the invention which broadly resides in opacifying an ethenoid resin from the group consisting of polymethyl methacrylate and polystyrene by holding the resin in contact with water at a temperature of at least about 100° C. for a period sufficient to effect the desired opacification.

Although the invention is broadly applicable to the polymethyl methacrylate and polystyrene resin plastics, including interpolymers and mixtures of such resins, some consideration must be given to the physical properties of the plastic to determine if the treatment of the invention is practical. This is chiefly true where superficial opacification of a molded article is desired. For example, if the molded article is made from a plastic which tends to be deformed or to "unmold" when heated to 100° C., the application of the present invention may involve difficulties. Frequently, however, it is practical to reshape such an article after the treatment of the present invention. Where the plastic in comminuted form is moistened with water and then molded, the softening temperature of the plastic is immaterial.

In practice, a small amount of preliminary testing will be found desirable to determine the optimum conditions for obtaining the opacity desired in specific instances, the factors influencing the speed and/or degree of opacification having been discussed above.

The present invention offers the advantages of a simple and inexpensive method of developing white opacification in molded and cast ethenoid resins. Opaque and translucent whites and tints can be obtained by simple treatment of an unpigmented polymer and the resins so opacified are adapted to practical and ornamental uses.

The invention also provides a simple method of opacifying the exterior layers, only, of massive plastics, which can then be carved, beveled, et cetera, for the production of ornamental effects.

The opacification produced is pure white. Color can be added by the use of dyestuffs.

As many apparently widely different embodiments of this invention can be made without departing from the spirit and scope thereof, it is to be understood that the invention is not limited to the specific embodiments thereof except as defined in the appended claims.

I claim:

1. Process of permanently opacifying a plastic comprising an ethenoid resin selected from the group consisting of polymethyl methacrylate and polystyrene which comprises holding said plastic in contact with water at a temperature of at least about 100° C. for a period sufficient to effect the desired opacification.

2. Process of permanently opacifying a plastic comprising an ethenoid resin selected from the group consisting of polymethyl methacrylate and polystyrene which comprises holding said plastic in contact with water at a temperature of at least about 100° C. and under superatmospheric pressure for a period sufficient to effect the desired opacification.

3. Process of producing a molded article characterized by opacification, from a plastic comprising an ethenoid resin selected from the group consisting of polymethyl methacrylate and polystyrene, which comprises moistening said plastic in comminuted form with water, and then molding the moistened plastic under heat and pressure.

4. Process of producing a molded article characterized by a uniform opacification, from a plastic comprising an ethenoid resin selected from the group consisting of polymethyl methacrylate and polystyrene, which comprises moistening said plastic in comminuted form free from particles coarser than about 40 mesh, with 1–5%, by weight thereof, of water, and then molding the moistened plastic under heat and pressure.

5. Process of permanently opacifying a molded article comprising an ethenoid resin selected from the group consisting of polymethyl methacrylate and polystyrene which comprises holding said molded article in contact with water at a temperature of at least about 100° C. and under superatmospheric pressure for a period sufficient to effect the desired opacification.

GLEN M. KUETTEL.